United States Patent [19]

Tanaka et al.

[11] Patent Number: 5,300,006
[45] Date of Patent: Apr. 5, 1994

[54] AUTOMATIC TOOL CHANGER

[75] Inventors: Norio Tanaka; Sanae Hattori; Hiroyuki Suzuki, all of Charlotte, N.C.

[73] Assignee: Okuma Machine Tools Inc., Charlotte, N.C.

[21] Appl. No.: 86,936

[22] Filed: Jul. 2, 1993

[51] Int. Cl.$^5$ .................................. B23Q 3/157
[52] U.S. Cl. ................................ 483/56; 483/67
[58] Field of Search .......... 483/54, 56, 55, 57, 483/30, 66, 67, 58, 41; 414/729, 736

[56] References Cited

U.S. PATENT DOCUMENTS

| | | | |
|---|---|---|---|
| 3,526,033 | 9/1970 | Saunders | 483/56 |
| 3,953,918 | 5/1976 | Bone et al. | 483/41 |
| 4,117,586 | 10/1978 | Uchida et al. | 409/232 X |
| 4,122,598 | 10/1978 | Pegler | 483/54 |
| 4,151,918 | 5/1979 | Nakane | 414/736 |
| 4,384,397 | 5/1983 | Nelson | 414/736 X |
| 4,399,603 | 8/1983 | Reed | 483/7 |
| 4,512,709 | 4/1985 | Hennekes et al. | 414/729 |
| 4,715,752 | 12/1987 | Oura | 409/232 |
| 4,761,877 | 8/1988 | Rupp | 483/54 |
| 4,905,369 | 3/1990 | Kawamura et al. | 483/54 |

FOREIGN PATENT DOCUMENTS

| | | | |
|---|---|---|---|
| 2527494 | 12/1983 | France | 483/67 |
| 144927 | 6/1988 | Japan | 483/56 |

Primary Examiner—William Briggs
Attorney, Agent, or Firm—Bell, Seltzer, Park & Gibson

[57] ABSTRACT

A machine tool having an automatic tool changer including a single drive motor for rotation and lateral movement of a tool storage magazine of the automatic tool changer. The single drive motor is connected to a transmission for selectively moving the magazine between a withdrawn storage position and an advanced position whereby a selected tool holder may be brought into engagement with the spindle. A carriage frame supports the magazine on a trackway for lateral movement and a rack gear extends parallel to a trackway. A speed reducer is connected to the drive motor and has an output shaft that supports a pinion gear positioned to engage the rack and a casing that is connected to the magazine. A locking pin is mounted to the carriage frame for selected movement between a first position whereby the magazine is locked and the rotation of the output shaft causes the carriage frame and magazine to advance along the trackway and a second position whereby the output shaft is locked and the rotation of the casing causes the magazine to rotate.

13 Claims, 5 Drawing Sheets

AUTOMATIC TOOL CHANGER

FIELD OF THE INVENTION

The present invention relates to a machine tool, such as a machining center, having an improved automatic tool changing capability.

BACKGROUND OF THE INVENTION

Advances in manufacturing technology related to the production of metal parts have led to the development of machine tools known as machining centers. Machining centers are sophisticated milling machines that are computer numerically controlled (CNC) and are capable of performing complex milling, boring and drilling operations with great accuracy and precision. The computer control allows these machines to be highly automated and they are capable of performing several successive operations on a part completely automatically.

These machine tools include a spindle which rotates about a central axis and which can be advanced and withdrawn along this axis. The spindle carries a tool engaging fixture capable of supporting any one of a variety of cutting tools. The workpiece is secured to a movable table that can move the part relative to the tool in directions perpendicular to the central axis. The part is brought into contact with the rotating tool by moving the table and/or the spindle and is thereafter machined to the desired shape and size.

A variety of tools is available to perform the various machining operations. Such tools include reamers, taps, end mills, slab mills and drill bits. To allow successive operations using these various tools to proceed automatically, however, it is necessary to transfer individual tools between the tool engaging fixture of the spindle and a tool storage magazine containing the various tools. At the completion of one operation, the tool is disengaged from the fixture and is transferred from the fixture to the magazine. A second tool is then transferred from the magazine to the fixture and a second machining operation can proceed.

Conventional machine tools often use an automatic tool changer to transfer individual tools between the spindle and the magazine. The tool storage magazine is rotatably mounted at a position withdrawn from the spindle axis and includes a plurality of tool holders arranged thereon. The tool storage magazine is rotated until a desired tool holder occupies a transfer position and the tool in that tool holder is then transferred to the spindle. The transfer position is fixed relative to the tool changer axis so that any one of the tool holders can be moved into the transfer position by rotation of the magazine.

One type of conventional tool changer typically includes one or more rotatably mounted transfer arms for transferring tools between the spindle and the tool holder at the transfer position of the magazine. In operation, a tool is removed from the spindle by the transfer arm and is transferred to an empty tool holder at the transfer position of the magazine. The magazine is then rotated until the tool holder carrying the desired tool occupies the transfer position and the transfer arm then transfers this tool to the spindle.

Other conventional tool changers obviate the need for a separate transfer arm by mounting the tool storage magazine on a trackway for moving the magazine between a withdrawn position and an advanced position. When the magazine is moved to its advanced position, the axis of the transfer position of the tool storage magazine coincides with the central axis of the spindle. The tool engaging fixture of the spindle can be advanced and withdrawn along the central axis, as described above, to selectively engage and disengage a tool in the tool holder of the magazine.

The operation of transferring a tool begins with the magazine in the withdrawn position and an empty tool holder occupying the transfer position. The tool engaging fixture is advanced along the spindle axis from the withdrawn position to an intermediate position. The magazine is advanced along the trackway until the empty tool holder engages the tool and the fixture then disengages the tool, thereby depositing the tool in the tool holder. The fixture is withdrawn and the magazine rotates until the desired tool occupies the transfer position. The fixture is then advanced to the intermediate position, engages the desired tool, and the tool storage magazine is withdrawn. The fixture and spindle are then further advanced to the engage the workpiece.

These conventional automatic tool changers greatly increase the productivity of machine tools, however, each of the conventional tool changers requires the use of at least two separate drive sources of either rotational or linear force. For example, the first above-described conventional tool changer may use an electric motor to rotate the tool storage magazine and a separate electric motor to rotate the transfer arm. Similarly, the second above-described machine may use an electric motor to rotate the magazine and a hydraulic cylinder to translate the magazine between the withdrawn and advanced positions. Thus, both types of conventional tool changers require the use of more than one drive source.

The use of separate drive sources in machine tools to drive the automatic tool changers is costly and complex. In addition to the physical space requirements and cost of the separate drive sources, the control system necessary to coordinate the functions of the two or more drive sources is by necessity quite complex.

It is therefore an object of the present invention to provide an improved automatic tool changer for machine tools.

It is still another object of the present invention to provide an improved automatic tool changer for machine tools wherein only a single drive source is used.

SUMMARY OF THE INVENTION

These and other objects and advantages of the present invention are achieved in the embodiments illustrated herein by the provision of an automatic tool changer that has a single drive motor for selectively rotating the tool storage magazine or, alternatively, advancing and withdrawing the magazine along a trackway by means of a rack and pinion gear.

The automatic tool changer is mounted to a machine tool which includes a machine frame and a spindle mounted thereto for rotation about and axial movement along a central axis. The spindle includes a tool engaging fixture for releasably engaging the tool.

The automatic tool changer also includes a tool storage magazine for supporting the various tools in a plurality of tool holders. The tool holders are disposed in a generally arcuate, preferably circular, arrangement so as to define a magazine axis extending through the arrangement. The tool storage magazine is mounted to the machine frame for movement about the magazine axis The tool storage magazine is also mounted to the machine frame for movement between a storage position withdrawn from the central axis and an advanced position proximate to the central axis so that the magazine axis is parallel to the central axis when the magazine is in the advanced position. The advanced position is such that any one of the tool holders can be axially aligned with the central axis, thereby defining a transfer position, by rotation of the tool storage magazine. The spindle can be axially moved so that a tool may be transferred between the tool holder at the transfer position and the tool engaging fixture of the spindle.

The tool storage magazine is mounted to the machine frame by a trackway fixedly mounted to the machine frame and extending generally between the withdrawn and advanced positions. A carriage frame supports the tool storage magazine and is mounted to the trackway for movement in either direction. The magazine is also rotatably mounted to the carriage frame for movement about the magazine axis. A rack gear extends parallel to the trackway and a hub, rotatably mounted to the carriage frame for rotation about the magazine axis, has a pinion gear secured thereto positioned to engage the rack.

A transmission means connected to the drive motor is operable in a first mode wherein the drive motor rotates the hub about the magazine axis and the magazine is locked to the carriage frame so as to translate the carriage frame along the trackway. The transmission means is also operable in a second mode wherein the drive motor moves the magazine about the magazine axis and the hub is locked to the carriage frame so as to permit a selected tool holder to be moved into the transfer position.

The transmission means includes a locking pin mounted to the carriage frame for movement between a first position, whereby the pin engages the magazine so as to preclude rotation thereof about the magazine axis, thereby defining the first mode, and a second position, whereby the pin engages the hub so as to preclude rotation thereof about the magazine axis, thereby defining the second mode.

The magazine further includes a protective cover fixedly mounted to the carriage frame and overlying the circular arrangement of tool holders, and an opening therein overlying the tool holder in the transfer position. A shield is fixedly mounted to the hub so as to overlie the opening in the protective cover when the magazine is in the withdrawn position and to be spaced from the opening when the magazine is in the advanced position.

BRIEF DESCRIPTION OF THE DRAWINGS

Some of the objects and advantages of the present invention having been stated, others will appear as the description proceeds when taken in conjunction with the accompanying drawings in which.

DETAILED DESCRIPTION OF A PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
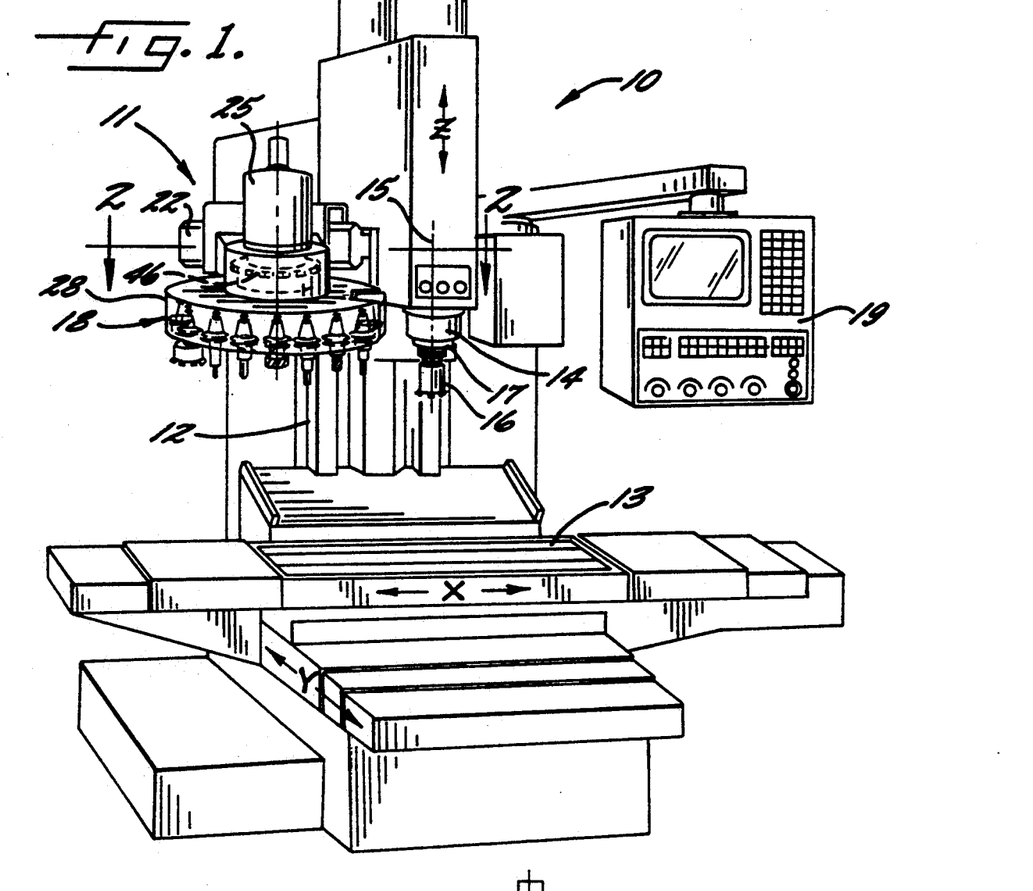
FIG. 1 is a perspective view of the automatic tool changer of the present invention mounted on a machine tool.

Referring more particularly to the drawings, FIG. 1 illustrates the machine tool 10 and automatic tool changer 11 of the present invention. The machine tool includes a machine frame 12 and a table 13 mounted on the frame for movement along the X and Y axes in the conventional manner. A spindle 14 is mounted to the frame above the movable table for rotation and for movement along its central axis 15 in a direction shown as Z in FIG. 1, also in the conventional manner. A tool 16 is supported in the spindle by a tool engaging fixture 17 and can be selectively replaced with various other tools held in a tool storage magazine 18 by means of the automatic tool changer.

In operation, the workpiece (not shown) is secured to the movable table 13 and is brought into contact with the rotating tool by lowering the spindle in the Z direction along the central axis. The various surfaces of the workpiece are machined by moving the table 13 in the X and Y directions and the spindle 14 in the Z direction. If other tools are necessary for further machining operations on the workpiece, the tool changer will automatically exchange the tool currently held in the spindle with the desired tool. The operation of the movable table 13, spindle 14 and automatic tool changer 11 is computer controlled by means of an input terminal 19 mounted to the machine frame and in accordance with known techniques. The operator pre-programs the machine tool from the input terminal and the workpiece will be machined into a finished part completely automatically.

Figure 7A:
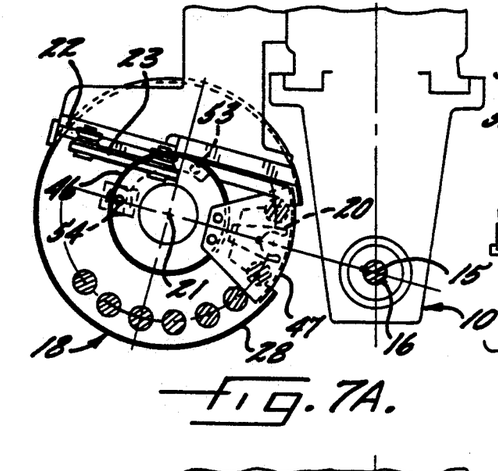
FIGS. 7A-7E and 8A-8E are diagrammatical plan and elevational views of the automatic tool changer of the present invention, illustrating sequentially the steps involved in the exchange of one tool with another.
Figure 7B:
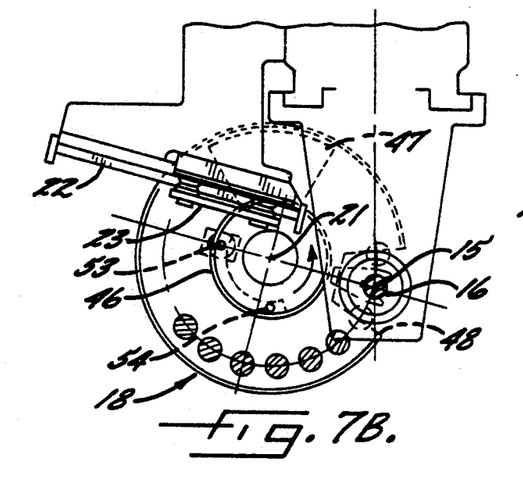
Figure 7C:
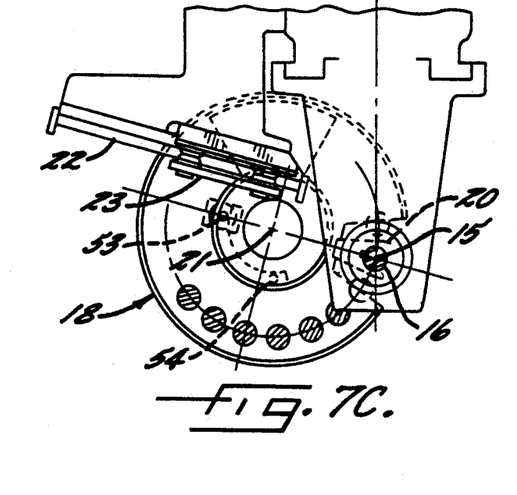
Figure 7D:
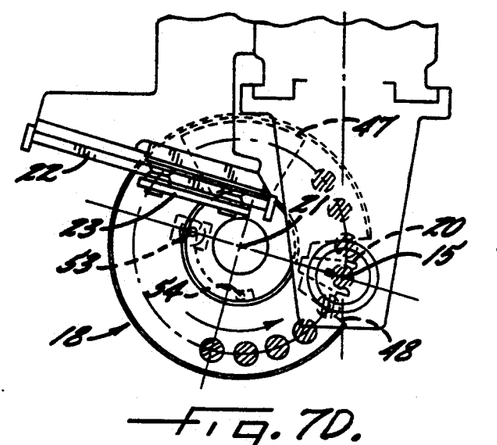
Figures 7E, 8E:
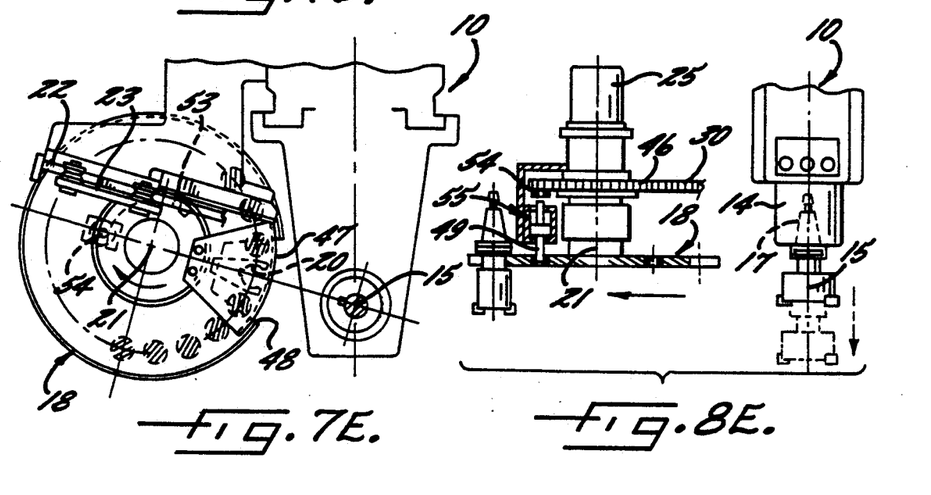
Figure 8A:
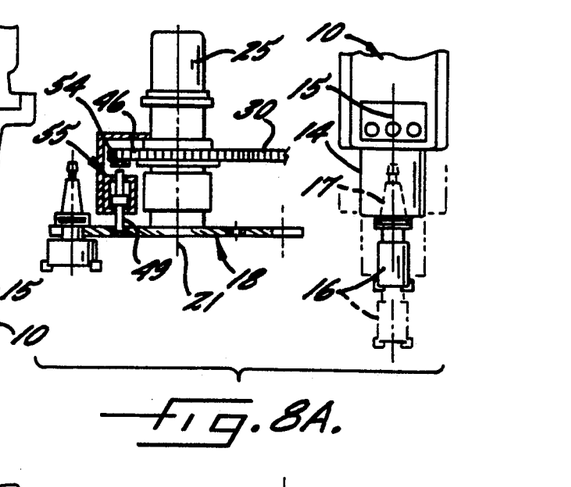
Figure 8B:
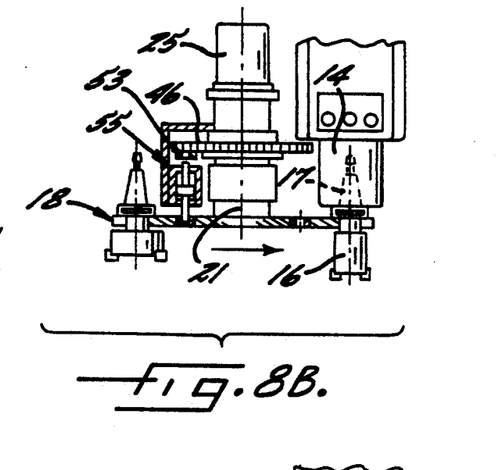
Figure 8C:
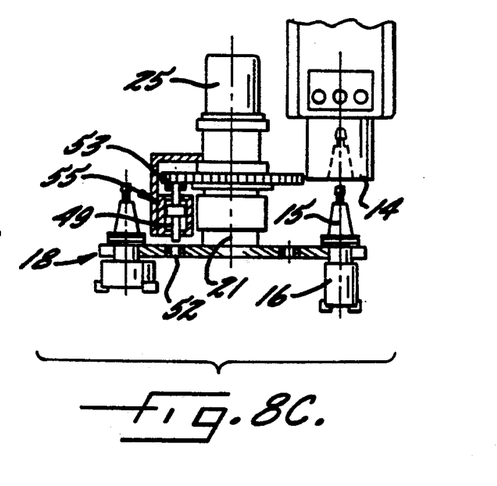
Figure 8D:
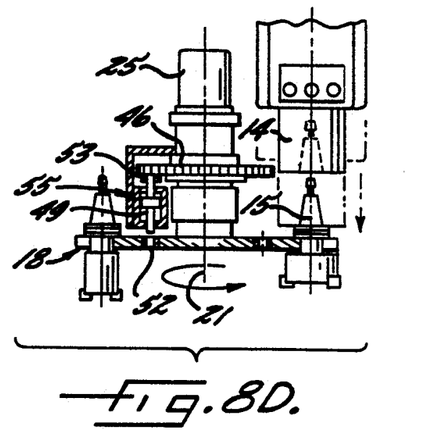

The operation of the automatic tool changer is diagrammatically illustrated in FIGS. 7A to 7E and 8A to 8E. As shown in FIG. 7A, the tool storage magazine 18, which includes a plurality of tool holders 20 disposed in a circular arrangement, is initially in a withdrawn position, as illustrated, with an empty tool holder occupying the transfer position of the tool changer. Subsequent to a machining operation, the spindle is withdrawn to an intermediate position, as shown in FIG. 8A, and the automatic tool changer is advanced until the empty tool holder engages the tool 16, as shown in FIGS. 7B and 7B. The tool engaging fixture releases the tool from the spindle, as shown in FIGS. 7C and 8C, and the spindle is retracted to a withdrawn position. The tool storage magazine 18 is then rotated until a desired tool occupies the transfer position of the tool changer, as shown in FIG. 7D. The spindle is advanced to the intermediate position and the tool engaging fixture engages the desired tool, as shown in FIG. 8D. The tool storage magazine is then laterally withdrawn and the spindle is further advanced, as shown in FIGS. 7E and 8E, to engage the tool 16 with the workpiece.

Figure 2:
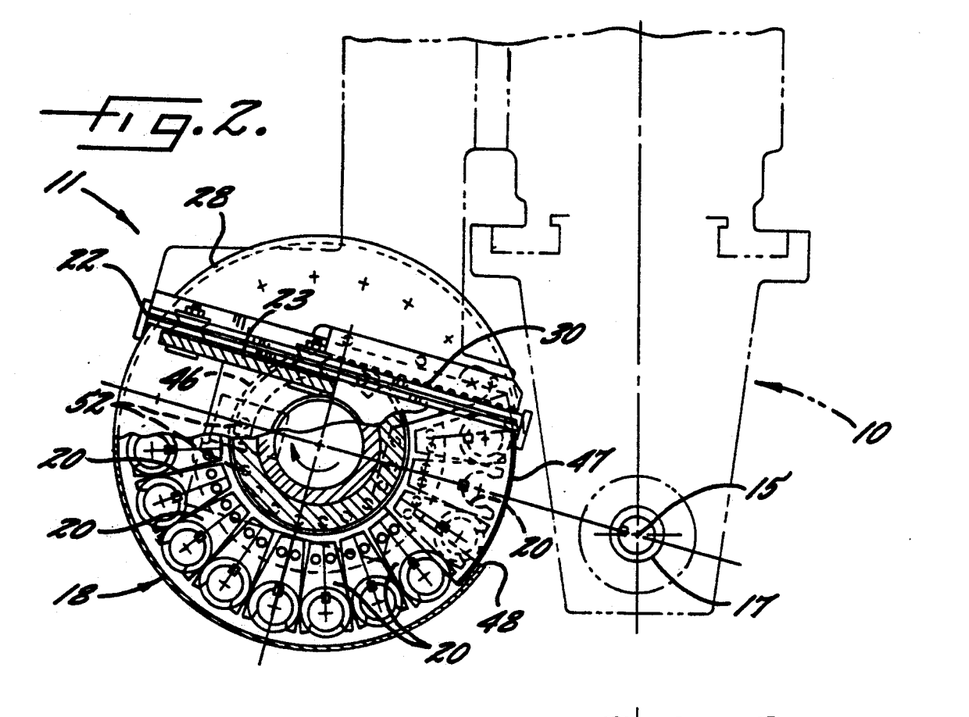
FIG. 2 is a partly sectioned plan view of the automatic tool changer of the present invention shown in the withdrawn position.
Figure 3:
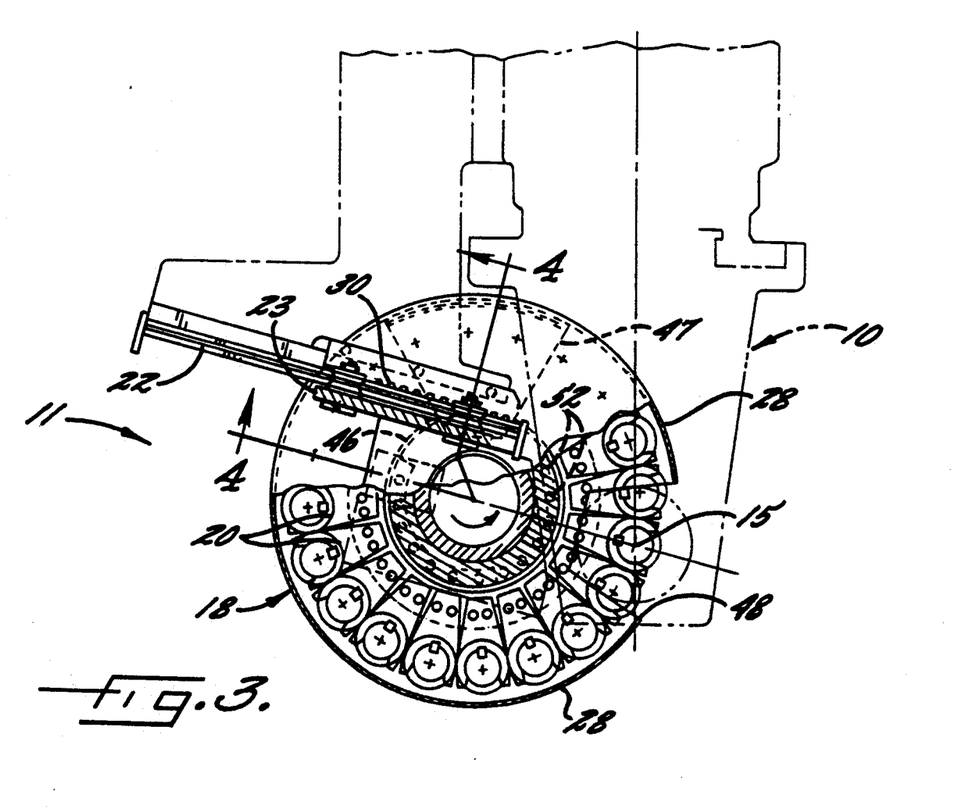
FIG. 3 is a partly sectioned plan view of the automatic tool changer of the present invention shown in the advanced position.
Figures 4, 5:
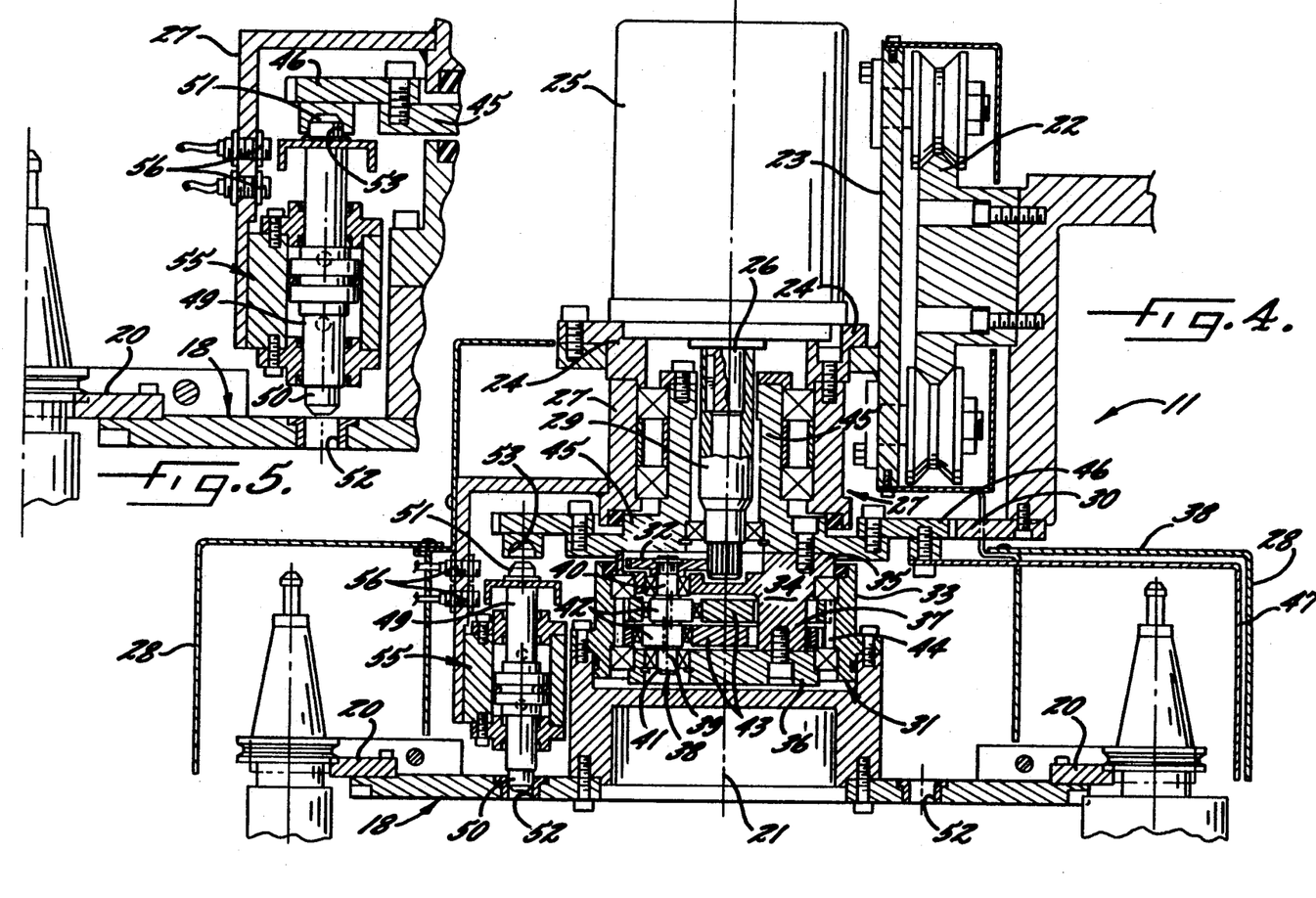
FIG. 4 is a sectional elevational view of the automatic tool changer of the present invention taken along line 4—4 in FIG. 3.
FIG. 5 is an enlarged and fragmentary sectional view of the automatic tool changer of the present invention, illustrating the locking pin.

The automatic tool changer includes a mounting means for mounting the tool storage magazine 18 to the machine frame for rotation about a vertical magazine axis 21, defined by the circular arrangement of tool holders 20, and for lateral movement between the withdrawn position (FIG. 2) and the advanced position (FIG. 3). This mounting means includes a trackway 22 fixedly mounted to the machine frame that extends linearly between the withdrawn and advanced positions and a carriage frame 23 having four wheels rotatably mounted thereon. As best seen in FIG. 4, the two upper wheels of the carriage frame engage an upper rail of the trackway and the two lower wheels engage a lower rail of the trackway so that the carriage frame can freely roll along the trackway while being rigidly supported by the trackway.

A motor mount 24 is fixedly secured to the carriage frame 23 and supports a drive motor 25 in a vertical position such that the drive shaft 26 of the motor is coaxial with the magazine axis. The drive shaft 26 extends into a housing 27 that is also secured to the motor mount. A protective cover 28 shrouds the tool storage magazine 18 and is fixedly secured to the housing 27 and the carriage frame 23. The cover 28 has an opening 48 therein that exposes the tool holder in the transfer position when the tool holder is in alignment with the central axis 15.

The drive motor 25 is an electric motor, such as the Okuma Brushless Motor Model No. BL-MS50E-20T, and provides the motive power for rotating the tool storage magazine 18 and for moving the automatic tool changer 11 between the withdrawn and advanced positions. The drive motor is supported by the motor mount, as discussed above, and the drive shaft 26 of the motor is connected to a first end of an input shaft 29 that extends through the housing 27. The second end of the input shaft 29 is connected to and provides the rotational input for a transmission means which selectively couples the drive shaft 26 of the motor to the magazine 18 or to a pinion gear 46 that cooperates with a rack gear 30, as further described below.

The transmission means includes a commercially available speed reducer 31, such as the RV-30A model manufactured by Teijin Seiki Co., Ltd. In the illustrated embodiment in FIG. 4, and as also schematically illustrated in FIG. 6, the speed reducer 31 includes an input gear 32 driven by the input shaft 29, a casing 33, and an output shaft 34. The rotational speed of the output shaft 34 of the speed reducer 31 is greatly reduced from the rotational speed of the input shaft 29 and speed reduction ratios on the order of about 1/128 are attainable. In addition, if the output shaft 34 is precluded from rotation, the casing 33 of the speed reducer will rotate at a similarly lower speed in the opposite direction, as more fully described below.

Figure 6:
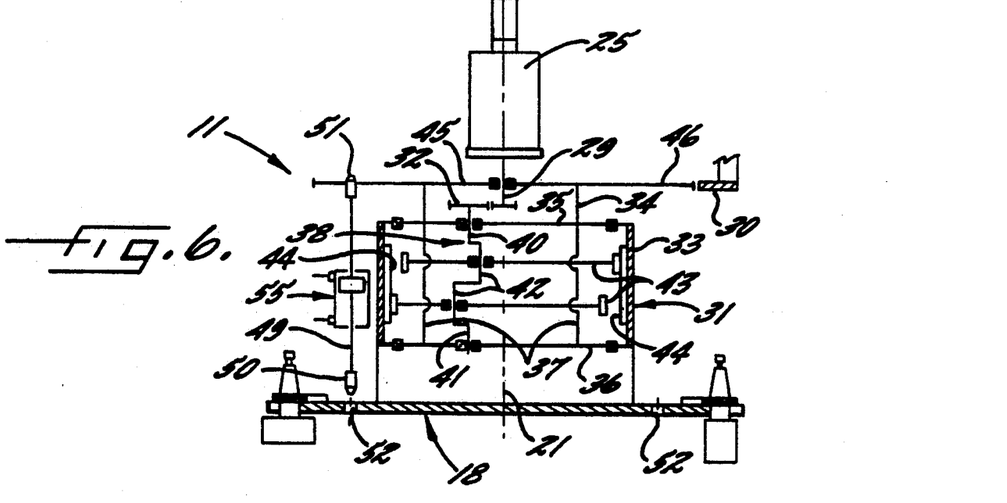
FIG. 6 is a schematic view of the automatic tool changer of the present invention, specifically illustrating the transmission means of the tool changer.

As illustrated in FIGS. 4 and 6, the output shaft 34 is mounted in the casing 33 on bearings for rotation about the magazine axis 21. The output shaft 34 includes first and second parallel flanges 35, 36 at either end of the speed reducer that extend perpendicularly to the magazine axis. The first and second flanges 35, 36 are connected by a plurality of circumferentially disposed posts 37 extending through the interior of the speed reducer so that rotational output can be supplied by the output shaft 34 at either end of the speed reducer.

The second end of the input shaft 29 extends into the speed reducer through a central opening in the first flange 35 of the output shaft and is formed with gear teeth thereon which engage and rotate the input gear 32 within the speed reducer. The input gear is fixed to a crankshaft 38 that has an axis 39 parallel to and laterally offset from the magazine axis 21.

The crankshaft has first and second coaxial end portions 40, 41 that are rotatably mounted in bearings fixed in the respective flanges 35, 36 of the output shaft for rotation about the axis 39. The crankshaft 38 has two crank arms 42 that are laterally offset from the crankshaft axis 39 and are positioned between the first and second flanges of the output shaft. The crank arms 42 are offset from each other by 180° about the crankshaft axis.

A planetary gear 43 is rotatably mounted on each crank arm of the crankshaft. The planetary gears 43 are slightly smaller than an internal gear 44 mounted to the interior surface of the casing 33 and have a fewer number of teeth. Duplicate planetary gears are employed and are positioned to engage the internal gear 44 at points offset from each other by 180° about the magazine axis to reduce imbalance in the speed reducer, although it would be readily understood by one of ordinary skill in the art that a speed reducer could be used with more or fewer planetary gears and associated crank arms.

As best seen in FIG. 6, the rotation of the input shaft 29 drives the input gear 32 and rotates the crankshaft 38 about its axis in the opposite direction. The crank arms 42 force the planetary gears 43 against the internal gear 44 and the planetary gears will orbit about the magazine axis 21 in the same direction as the rotation of the crankshaft. The orbiting motion of the planetary gears 43 against the internal gear 44 causes the crankshaft 38 to orbit about the magazine axis 21 in the opposite direction to the crankshaft rotation. Thus, the orbiting motion of the crankshaft 38, which is held at both ends by the output shaft 34, causes the output shaft to rotate in the same direction and about the same axis 21 but at a much slower speed than the input shaft 29.

If the output shaft 34 is precluded from rotation, the advancement of the planetary gears 43 will cause the internal gear 44, and therefore the casing 33, to rotate in a direction opposite from that of the input shaft 29. The tool storage magazine 18 is connected to the casing 33 of the speed reducer 31 and will therefore rotate about the magazine axis. Thus, a desired tool holder can be rotated into the transfer position of the tool changer by first locking the output shaft 34 and then advancing the drive motor the necessary number of revolutions.

The drive means further includes a hollow hub 45 rotatably mounted within the housing 27 and positioned so that the input shaft 29 of the motor extends therethrough. The hub 45 is supported by bearings external to the hub that separate it from the housing 27 and by a bearing internal to the hub that separates it from the input shaft 29.

The hub 45 supports a pinion gear 46 positioned to engage a rack gear 30 that is mounted to the machine frame and which extends parallel to the trackway 22 between the advanced and withdrawn positions of the automatic tool changer. The hub 45 is secured to the first flange 35 of the output shaft of the speed reducer so that, when the casing is precluded from rotation, the hub 45 will rotate and the pinion gear 46 will advance along the rack gear 30. In addition, the hub 45 supports a shield 47 that overlies the opening 48 in the protective cover 28 when the magazine is in the withdrawn position. Therefore, as the magazine 18 advances along the trackway 22, the hub 45 rotates and the shield 47 will be spaced apart from the opening 48, exposing the tool holder at the transfer position when the magazine 18 reaches the advanced position, compare FIGS. 7A and 7B.

The transmission means further includes a locking pin 49, as best shown in FIG. 5, that is mounted to the housing and which selectively precludes either the casing 33 or the output shaft 34 from rotation with respect to the carriage frame 23. The locking pin 49 has first and second ends 50, 51 and is movable between a first lowered position (FIG. 4) and a raised second position (FIG. 5). In the first position the first end 50 of the locking pin is received in a corresponding hole 52 in the tool storage magazine 18 and prevents the casing from rotation, thereby defining the above described first mode of operation. In the second position, the second end 51 of the pin engages one of two corresponding holes 53, 54 on the hub and precludes the output shaft from rotation, thereby defining the second mode of operation. Thus, in the first mode the hub 45 and pinion gear 46 will rotate and the tool changer will advance along the trackway and in the second mode the casing 33 and tool storage magazine 18 will rotate about the magazine axis.

In the illustrated embodiment, the locking pin 49 is movable between the first and second positions by a reversible hydraulic cylinder 55, although it would be readily understood by one of ordinary skill in the art that other means for moving the locking pin 49 could be used, such as a solenoid or pneumatic cylinder.

The operation of the tool changer is controlled by a computer that coordinates the operation of the drive motor 25, locking pin 49 and spindle 14. Sensing means (not shown) are used to sense the position of the various movable components of the tool changer, such as the magazine 18, carriage frame 23 and drive motor 25, and provide feedback to the computer, in accordance with known techniques, so that it can accurately control the operation of the tool changer. For example, a linear displacement transducer (not shown) can be mounted on the trackway 22 adjacent the carriage frame 23 and be operatively connected to the computer to provide feedback as to the position of the carriage frame 23. In the illustrated embodiment, proximity probes 56 or other sensing means are mounted to the housing 27 to sense the position of the locking pin 49.

Referring to FIGS. 2, 3, 7A-7E and 8A-8E, a tool change operation begins with an empty tool holder in the transfer position of the magazine and the magazine in the withdrawn position. The spindle 14 is withdrawn from the advanced, workpiece-engaging position to an intermediate position as shown in FIG. 8A.

The locking pin 49 is moved to the first position whereby it engages one of the plurality of holes 52 in the tool storage magazine and locks the magazine to preclude rotation thereof. The number of holes in the magazine corresponds to the number of tool holders of the magazine and, in the illustrated embodiment, twenty (20) tool holders are disclosed, although it would be readily understood by one of ordinary skill in the art that more or fewer tool holders could be used.

The drive motor 25 is started and the output shaft 34 of the speed reducer rotates the hub 45 and pinion gear 46 so that the magazine is advanced along the trackway to the advanced position, as shown in FIGS. 3, 7B and 8B. The empty tool holder in the transfer position engages the tool 16 in the spindle 14 and the drive motor is stopped. The tool engaging fixture 17 releases the tool and the spindle is withdrawn, as shown in FIG. 8C.

The locking pin 49 is shifted by the hydraulic cylinder to the second position and engages the first hole 53 in the hub. The output shaft 34 of the speed reducer is now locked so that when the drive motor is started the casing 33 of the speed reducer and the magazine will be rotated. The computer controls the amount and direction of rotation of the motor, in accordance with known techniques, so that the magazine is rotated until the tool holder with the desired tool occupies the transfer position. The drive motor is stopped and the spindle 14 is advanced so that the tool engaging fixture 17 can engage the new tool, as shown in FIG. 8D.

The locking pin 49 is moved back to the first position, so as to be received in the associated magazine hole 52 and to thereby lock the magazine, and the drive motor is started in the direction opposite to that used to advance the magazine so that the magazine is withdrawn along the trackway, as shown in FIGS. 7E and 8E. The spindle 14 is then advanced with the new tool to engage the workpiece.

It may occasionally be desirable to rotate the magazine 18 when it is in the withdrawn position; for example, to allow an operator to replace tools in the magazine due to wear, etc., or to rotate a different empty tool holder into the transfer position of the magazine. To rotate the magazine, the locking pin 49 is moved to the second or upper position and engages the second hole 54, which is circumferentially spaced apart from the first hole 53 so as to receive the locking pin 49 when the magazine is in the withdrawn position, thereby locking the hub 45. The motor can be advanced by the necessary amount and in the proper direction to rotate the magazine accordingly.

The automatic tool changer of the present invention is driven by only one drive source, the drive motor 25. The drive motor 25 provides the necessary motive force to rotate the tool storage magazine and to advance and withdraw the magazine along the trackway. The elimination of the additional drive sources used by conventional automatic tool changers provides substantial savings in terms of cost and complexity in the manufacture and repair of these machines.

In the drawings and specification, preferred embodiments of the invention have been illustrated and described, and although specific terms are employed, they are used in a generic and descriptive sense and not for the purposes of limitation.

That which is claimed is:

1. A machine tool having an automatic tool changing capability and comprising
   a machine frame,
   a spindle rotatably mounted to said machine frame for rotation about a central axis and for axial movement along said central axis, and including a tool engaging fixture,
   a tool storage magazine for supporting a plurality of tools and including a plurality of tool holders disposed in a generally arcuate arrangement which defines a magazine axis which extends through said arcuate arrangement, means mounting said tool storage magazine to said machine frame for movement about said magazine axis and for movement between a storage position withdrawn from said central axis and an advanced position proximate to said central axis, with said magazine axis being parallel to said central axis when said magazine is in said advanced position, and such that in said advanced position any one of said tool holders may be aligned with said central axis, and drive means comprising a single drive motor for selectively moving said magazine between said withdrawn and advanced positions and moving said magazine about said magazine axis, so that when said magazine is in said advanced position a selected tool holder may be brought into alignment with said central axis and said spindle may be axially moved so that a tool may be transferred between the selected tool holder and said tool engaging fixture of said spindle.

2. The machine tool as defined in claim 1 wherein said plurality of tool holders are disposed in a circular arrangement and such that said magazine axis extends centrally through said circular arrangement.

3. The machine tool as defined in claim 1 wherein said means mounting said tool storage magazine to said machine frame comprises a trackway fixedly mounted to said machine frame and extending generally between said withdrawn and advanced positions, a carriage frame supported for movement in either direction along said trackway, and with said magazine being rotatably mounted to said carriage frame for rotation about said magazine axis.

4. The machine tool as defined in claim 3 wherein said drive means further comprises a rack gear fixedly mounted to said machine frame and extending parallel to said trackway, a hub rotatably mounted to said carriage frame for rotation about said magazine axis and including a pinion gear positioned to engage said rack, and transmission means connected to said drive motor and operable in a first mode wherein said drive motor rotates said hub about said magazine axis and said magazine is locked to said carriage frame so as to translate the carriage frame along said trackway, and a second mode wherein said drive motor rotates said magazine about said magazine axis and said hub is locked to said carriage frame so as to permit a selected tool holder to be aligned with said central axis of said spindle when said magazine is in said advanced position.

5. The machine tool as defined in claim 4 wherein said transmission means comprises a locking pin mounted to said carriage frame for movement between a first position engaging said magazine so as to preclude rotation thereof about said magazine axis and thereby define said first mode, and a second position engaging said hub so as to preclude rotation thereof about said magazine axis and thereby define said second mode.

6. The machine tool as defined in claim 4 wherein said transmission means further comprises an input shaft rotatably mounted to said hub so as to be coaxial with said magazine axis and having a first end directly connected to said drive motor and a second end formed with gear teeth thereon, a casing connected to said magazine so as to be coaxial with said magazine axis, an internal gear mounted in said casing so as to be coaxial with said magazine axis, at least one planetary gear mounted in said casing so as to engage said internal gear, an output shaft rotatably mounted in said casing so as to be coaxial with said magazine axis and connected to said hub, said output shaft having first and second flanges extending generally perpendicular to said magazine axis, and at least one crankshaft having first and second coaxial opposite end portions, at least one laterally offset crank arm disposed between said opposite end portions, and an input gear coaxially mounted to said first end portion of said crankshaft so that said input gear engages said teeth formed on said second end of said input shaft, said crankshaft being mounted within said casing with said first end portion thereof rotatably engaging said first flange and said second end portion thereof rotatably engaging said second flange so that said coaxial end portions define a crankshaft axis which is parallel to and laterally offset from said magazine axis, and said crank arm rotatably engaging said one planetary gear so that rotation of said crankshaft about said crankshaft axis causes said planetary gear to advance within said internal gear and to orbit about said magazine axis, and so that when said transmission means is in said first mode said crankshaft orbits about said magazine axis and said output shaft rotates about said magazine axis and when said transmission means is in said second mode said casing rotates about said magazine axis.

7. The machine tool as defined in claim 1 wherein said magazine further comprises a protective cover fixedly mounted to said carriage frame and overlying said arrangement of tool holders of said magazine, said protective cover including an opening positioned so as to expose the tool holder aligned with said central axis when said magazine is in said advanced position.

8. The machine tool as defined in claim 7 wherein said magazine further comprises a shield fixedly mounted to said hub so as to overlie said opening in said protective cover when said magazine is in said withdrawn position and to be spaced from said opening when said magazine is in said advanced position.

9. A tool storage assembly adapted to be mounted to a machine tool frame for selective translational and rotational movement, and comprising a carriage frame, said carriage frame having roller means adapted for mounting said carriage frame for movement along a trackway mounted to the machine tool frame, a tool storage magazine for supporting a plurality of tools and including a plurality of tool holders disposed in a circular arrangement which defines a magazine axis which extends centrally through said circular arrangement, means mounting said tool storage magazine to said carriage frame for movement about said magazine axis, drive means comprising a single drive motor for selectively moving said magazine along said trackway and about said magazine axis, comprising a rack gear fixedly mounted to the machine tool frame and extending parallel to said trackway, a hub rotatably mounted to said carriage frame for rotation about said magazine axis and including a pinion gear positioned to engage said rack, and transmission means connected to said drive motor and operable in a first mode wherein said drive motor rotates said hub about said magazine axis and said magazine is locked to said carriage frame so as to translate the carriage frame along said trackway, and a second mode wherein said drive motor rotates said magazine about said magazine axis and said hub is locked to said carriage frame.

10. The tool storage assembly as defined in claim 9 wherein said transmission means comprises a locking pin mounted to said carriage frame for movement between a first position engaging said magazine so as to preclude rotation thereof about said magazine axis and thereby define said first mode, and a second position engaging said hub so as to preclude rotation thereof about said magazine axis and thereby define said second mode.

11. The tool storage assembly as defined in claim 9 wherein said transmission means further comprises
an input shaft rotatably mounted to said hub so as to be coaxial with said magazine axis and having a first end directly connected to said drive motor and a second end formed with gear teeth thereon,
a casing connected to said magazine so as to be coaxial with said magazine axis,
an internal gear mounted in said casing so as to be coaxial with said magazine axis,
at least one planetary gear mounted in said casing so as to engage said internal gear,
an output shaft rotatably mounted in said casing so as to be coaxial with said magazine axis and connected to said hub, said output shaft having first and second flanges extending generally perpendicular to said magazine axis, and
at least one crankshaft having first and second coaxial opposite end portions, at least one laterally offset crank arm disposed between said opposite end portions, and an input gear coaxially mounted to said first end portion of said crankshaft so that said input gear engages said teeth formed on said second end of said input shaft, said crankshaft being mounted within said casing with said first end portion thereof rotatably engaging said first flange and said second end portion thereof rotatably engaging said second flange so that said coaxial end portions define a crankshaft axis which is parallel to and laterally offset from said magazine axis, and said crank arm rotatably engaging said one planetary gear so that rotation of said crankshaft about said crankshaft axis causes said planetary gear to advance within said internal gear and to orbit about said magazine axis, and so that when said transmission means is in said first mode said crankshaft orbits about said magazine axis and said output shaft rotates about said magazine axis and when said transmission means is in said second mode said casing rotates about said magazine axis.

12. The tool storage assembly as defined in claim 9 wherein said magazine further comprises a protective cover fixedly mounted to said carriage frame and overlying said circular arrangement of tool holders of said magazine, said protective cover including an opening positioned so as to expose a tool holder.

13. The tool storage assembly as defined in claim 12 wherein said magazine further comprises a shield fixedly mounted to said hub so as to initially overlie said opening in said protective cover and to be spaced apart therefrom as said magazine is moved along said trackway.

* * * * *